(12) United States Patent
Scheibner et al.

(10) Patent No.: US 10,180,162 B2
(45) Date of Patent: Jan. 15, 2019

(54) ROLLING-ELEMENT BEARING INCLUDING MOUNTING FLANGE

(71) Applicant: Aktiebolaget SKF, Gothenburg (SE)

(72) Inventors: Peter Scheibner, Vejle (DK); Jonas Kristensen, Skjern (DK); Mats Persson, Amsterdam (NL); Jesko-Henning Tanke, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/648,548

(22) Filed: Jul. 13, 2017

(65) Prior Publication Data

US 2018/0023622 A1    Jan. 25, 2018

(30) Foreign Application Priority Data

Jul. 21, 2016  (DE) .................. 10 2016 213 361
Jul. 21, 2016  (DE) .................. 20 2016 103 971 U

(51) Int. Cl.
*F16C 19/38* (2006.01)
*F16C 33/58* (2006.01)
(Continued)

(52) U.S. Cl.
CPC ............ *F16C 19/386* (2013.01); *F03D 80/70* (2016.05); *F16C 33/583* (2013.01); *F16C 33/586* (2013.01); *F16C 35/045* (2013.01); *F16C 35/063* (2013.01); *F16C 35/067* (2013.01); *F16C 33/60* (2013.01); *F16C 2226/60* (2013.01); *F16C 2240/40* (2013.01); (Continued)

(58) Field of Classification Search
CPC .... F16C 19/386; F16C 33/583; F16C 35/045; F16C 2360/31; F16C 2300/14
See application file for complete search history.

(56) References Cited

U.S. PATENT DOCUMENTS 3,589,747 A     6/1971  Asberg
7,084,522 B2 *  8/2006  Wobben .................. 290/55
(Continued)

FOREIGN PATENT DOCUMENTS

DE      102009014923 A1    9/2010
JP      2002339985 A       11/2002
(Continued)

*Primary Examiner* — Thomas R Hannon
(74) *Attorney, Agent, or Firm* — Bryan Peckjian; SKF USA Inc. Patent Dept.

(57) ABSTRACT

A rolling-element bearing includes a first ring having two raceways and at least one second ring having two raceways and rolling elements between the rings, and a ring raceway width is defined as an axial distance between the axially outer ends of the first ring raceways. A radially extending integral mounting flange extends from the first ring at a location between first and second sides of the first ring, and the flange has an axial abutment surface. A first shoulder extends from the first side toward the axial abutment surface. The first axial abutment surface is located an axial distance from the first side of the first ring, the axial distance being 10% to 50% of the ring raceway width, and a ratio of an outer diameter of the mounting flange to the width of the first ring raceways is from 5 to 25.

13 Claims, 1 Drawing Sheet

(51) Int. Cl.
*F16C 35/04* (2006.01)
*F16C 35/063* (2006.01)
*F16C 35/067* (2006.01)
*F03D 80/70* (2016.01)
*F16C 33/60* (2006.01)

(52) U.S. Cl.
CPC ...... *F16C 2240/70* (2013.01); *F16C 2300/14* (2013.01); *F16C 2360/31* (2013.01)

(56) References Cited

U.S. PATENT DOCUMENTS 7,982,455 B2 * 7/2011 Ito et al. .................. 384/207.25
2002/0186910 A1 12/2002 Maret
2012/0091725 A1 4/2012 Yoshida et al.

FOREIGN PATENT DOCUMENTS

JP 200803194 A 2/2008
WO 2014024139 A1 2/2014

* cited by examiner

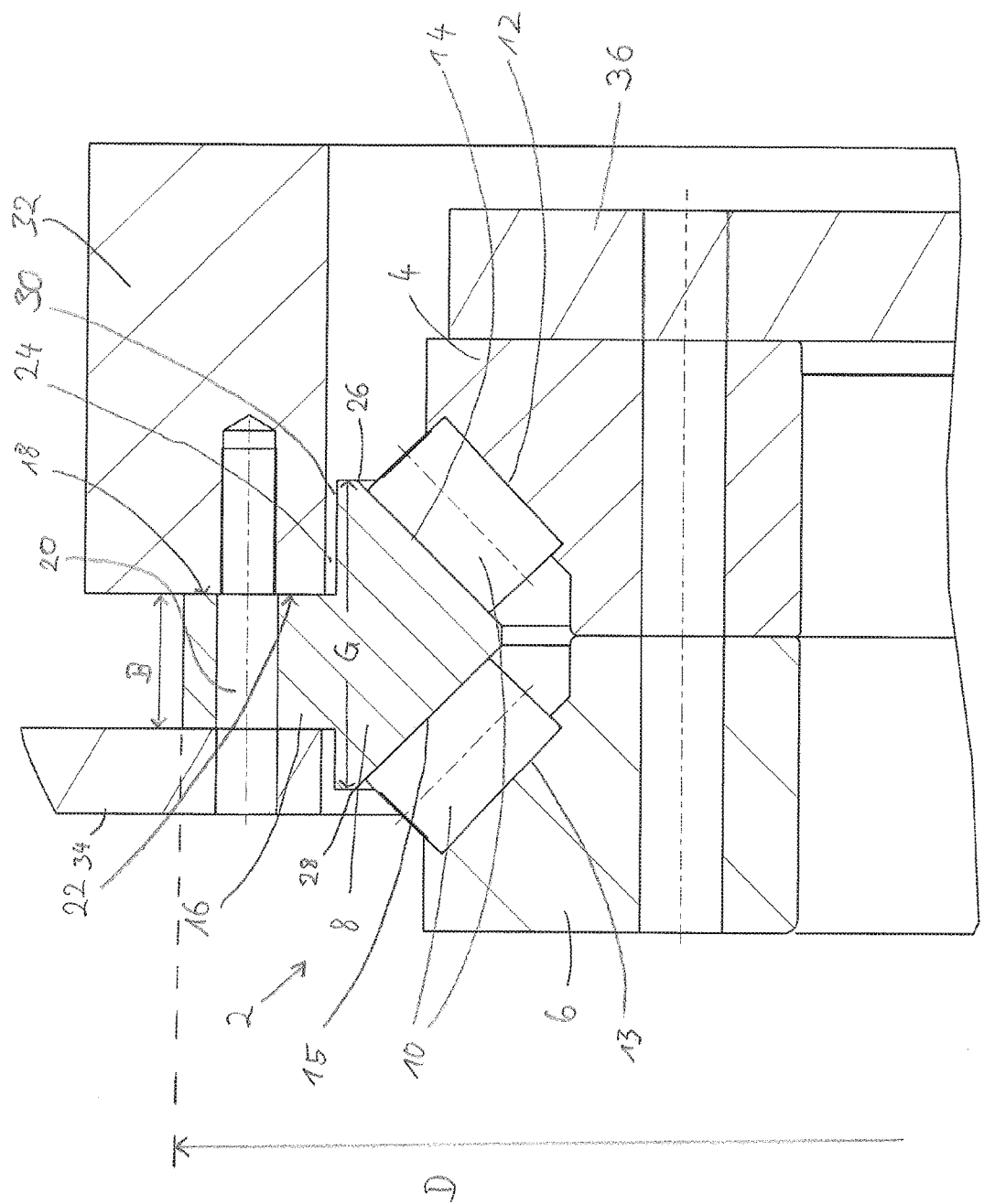

ROLLING-ELEMENT BEARING INCLUDING MOUNTING FLANGE

CROSS-REFERENCE

This application claims priority to German patent application no. 20 2016 103 971.1 filed on Jul. 21, 2016, and German patent application no. 10 2016 213 361.6 filed on Jul. 21, 2016, the contents of which are fully incorporated herein by reference.

TECHNOLOGICAL FIELD

The present disclosure relates to a double row rolling-element bearing according to claim 1, as well as a wind turbine including such a rolling-element bearing.

BACKGROUND

Double row rolling-element bearings are known both that include a common bearing ring for both rolling element rows and that include two separate bearing rings for the two rolling element rows. For example, a double row tapered roller bearing is known from DE 10 2009 014 923 A1 (a family member of US 2010/0247295) that includes a one-part outer ring having two raceways. The opposite raceway is configured two-part, and each inner ring includes an inner raceway. The two rolling element rows, which are comprised of truncated-cone-shaped rolling elements, roll between the raceways of the inner rings and the respective raceway of the outer ring. In a region radially outside the raceways the outer ring includes through-bores, using which it can be screwed onto a machine part such as, for example, a housing. Disadvantageously, when the bearing is installed on a machine part a thermal imbalance can arise, whereby a precise positioning of the outer ring with respect to the inner rings is no longer provided. For example, the raceway that lies opposite the side of the outer ring fixed on the machine part can be more heavily thermally loaded so that the outer ring on the side facing away from the machine part is warmer than the flange side facing the machine part. Due to this greater heating the outer ring on the side facing away may have a somewhat greater diameter due to thermal expansion than on the flange side, which has a lower temperature also due to heat transmission via the direct contact with the machine part having the mass. Due to this non-uniform heat distribution in the outer ring it can tilt due to the greater radial extension of the non-fixed side. As a result a uniform loading of the two rolling element rows is no longer present, and this is disadvantageous for a secure operation and shortens the service life.

SUMMARY

An aspect of the disclosure is to provide a double row rolling-element bearing that is axially fixed to a machine part, where the bearing is to be reliably protected in operation against disadvantageous deformations due to thermal expansion.

According to the disclosure the rolling-element bearing comprises at least one first inner ring and at least one outer ring and two rows of rolling elements that roll between a first and a second raceway of the at least one inner ring and a first and a second raceway of the at least one outer ring. The inner ring or the outer ring is configured one-part and includes a radially extending integral mounting flange having a radially extending first axial abutment surface. Axially extending through-openings for axial attachment of the inner- or outer-ring to a radial counter-abutment surface are disposed in the mounting flange. The inner ring or the outer ring including the mounting flange includes a shoulder on the side of the first axial abutment surface with the result that the first axial abutment surface of the mounting flange is axially offset inward toward the second raceway of this inner ring or outer ring with respect to an outer axial end of the first raceway of this inner ring or outer ring by 10% to 50% of the total width G of the raceways. Here the first raceway and the first axial abutment surface lie on the same side of the rolling-element bearing and the second raceway lies on the opposite side. A particularly preferred design provides that the first axial abutment surface is offset inward toward the second raceway of this inner ring or outer ring by 20% to 40% of the total width G of the raceways. The total width G of the raceways is determined as the axial spacing of the opposing outer axial ends of the raceways. According to the disclosure the ratio of outer diameter D of the mounting flange to the total width G of the raceways falls in a range of 5:1 to 25:1. It has been found that in this ratio range, which describes a rolling-element bearing that has a very small spacing of the two rolling element rows with respect to the diameter, disposing a shoulder on the bearing ring including the mounting flange is particularly advantageous. Most preferably the ratio of the outer diameter D of the mounting flange to the total width falls between 14 and 16.

In one exemplary embodiment of the rolling-element bearing, the outer diameter D of the mounting flange of the rolling-element bearing is greater than 100 cm, most preferably greater than 200 cm.

In one exemplary embodiment, the rolling-element bearing is configured as a double row tapered roller bearing in back-to-back arrangement.

It is preferable that the outer ring is configured one-part and includes the mounting flange as well as two raceways, and that the inner ring is configured as a two-part inner ring, which includes the inner rings wherein each of the inner rings has a raceway. It is advantageous that the abutment surface of the mounting surface then moves toward the center of the two tapered roller rows, whereby the distance of the abutment surface to the raceway opposite the abutment surface is reduced. An improved heat transfer from regions of the outer ring in the vicinity of the raceway facing away via the abutment surface into the housing is thereby made possible. In operation due to the offset abutment surface a more uniform heat distribution in the outer ring is made possible. Furthermore, the effective lever arm between the abutment surface and an outer axial end of the axially opposing raceway of the outer ring is reduced.

Alternatively, in one embodiment barrel-shaped rolling elements are disposed instead of conical rolling elements. The two raceways of the outer ring are then correspondingly designed convex. The two raceways of the two inner rings are also configured convex, wherein the two raceways of the inner ring can be disposed on a common sphere. Here the rolling-element bearing is preferably configured as a double-row barrel roller bearing in an O-arrangement.

A particularly preferred embodiment provides that the outer ring includes a shoulder on both axial sides, wherein the second side of the mounting flange, which second side opposes the abutment surface, is offset inward toward the first raceway by 10% to 40% of the total width G of the raceways. It is advantageous here that the mounting flange thereby has a far smaller axial width B than the total width G of the raceways. With the use of screw connections for fixing the outer ring to the housing considerably shorter screws can thereby be used than with a connection using a mounting flange that is exactly as wide as the total width of the raceways. It is furthermore advantageous that due to the inwardly offset mounting flange the axial outer region raceway, which is disposed radially inside the second shoulder, lies at least partially outside of the axial region of the screw connection. Here the shoulder on the side of the first axial abutment surface is called the first shoulder and the shoulder opposite the first abutment surface is defined as the second shoulder, from outside of which screws can be inserted through the through-openings and the mounting flange can be screwed onto the housing.

It is advantageous here that radial forces that act from the rolling elements via the raceways on the outer ring have a greatly reduced influence on the screw connection at the two axial ends, since due to the axial shoulders no direct radial material connection to the mounting flange receiving the screw connection arises in this axial region of the raceways. The outer ring can thus widen radially in the region of the shoulders without the mounting flange and thus the screw connection necessarily taking part in this enlarging of the diameter. In the region of the first shoulder on the side of the first axial abutment surface an air gap is preferably formed, which is configured as an annular gap between the housing and the outer ring. Due to the disclosed arrangement of the shoulders on the outer ring, an operationally-induced heat-related widening of the inner ring, which results in a diameter enlargement of the inner ring, can be compensated by the outer ring itself, without it having a disadvantageous effect on the screw connection; for example, a one-sided widening of the outer ring on the side opposite the housing and a tilting thus resulting of the outer ring with respect to the inner ring is thereby effectively prevented.

In a preferred exemplary embodiment the axial width B of the mounting flange in the region of the through-openings is at least 30% of the total width of the raceways. Due to this minimum width B of the mounting flange it is ensured that on the one hand the raceways in the region of the shoulders can expand radially in a limited manner with respect to the mounting surface, and on the other hand, however, a total stiffness of the outer ring is maintained, which reliably supports the two raceways of the outer ring radially. Particularly preferable is that an axial width of the first shoulder be between 20% and 40% of the total width of the raceways, and that an axial width of the second shoulder be between ten and 30% of the second shoulder. The mounting flange is preferably asymmetrically disposed with respect to the total width of the raceways, with the result that an axial region of the first raceway of the outer ring, which lies axially outside the axial region of the mounting flange, is larger than a corresponding axial region of the second raceway of the outer ring that lies axially outside the axial-region mounting flange. In other words, the axial overlap of the first raceway including the mounting flange is smaller than the axial overlap of the second raceway.

A further development of the rolling-element bearing provides that the rolling-element bearing furthermore includes a reinforcing ring, wherein the second side of the mounting flange, which second side opposes the abutment surface, serves as abutment surface for the reinforcing ring connectable to the mounting flange. The reinforcing ring has an outer diameter that is greater than the outer diameter D of the mounting flange. By these measures it is achieved that the entire stiffness of the outer ring is increased and a one-sided widening of the outer ring on the side facing away from the housing, and thus a tilting thereof, is counteracted. It is particularly preferably provided that a second shoulder is provided so that the axial extension of the reinforcing ring overlaps axially with a partial region of the second raceway. A particularly installation-space optimized arrangement is thereby provided. The reinforcing ring can be embodied in the shape of a disc; however it can also be embodied in the shape of an L-shaped sleeve wherein a cylindrical section of the L-shaped sleeve is screwed onto the mounting flange.

The disclosure further relates to a wind turbine, which includes a stationary housing including bearing according to the disclosure fixed thereto. It is provided that the rolling-element bearing serves as a rotor bearing here, wherein the rolling-element bearing is configured as a slew bearing. According to the disclosure it is provided that the housing includes the counter-abutment surface, which is in contact with the first abutment surface of the rolling-element bearing in the assembled state. The abutment surface and the counter-abutment surfaces can be in direct contact here or, alternately, a thin intermediate element, for example in the form of a friction-increasing disc, can be installed between the abutment surface and the counter-abutment surfaces so that these are indirectly in contact. Furthermore a reinforcing ring may be provided, which is in contact with the second abutment surface of the mounting flange, wherein the reinforcing ring and the mounting flange are fixed to the counter-abutment surface of the housing using a common screw connection. It is advantageous here that an additional stiffness is introduced into the system via the common screw connection.

A particularly preferred development of the wind turbine provides that the rolling-element bearing is configured as a double row tapered roller bearing or barrel roller bearing in an O-arrangement wherein the outer ring is configured one-part and includes the mounting flange, and the inner ring is configured as two-part inner rings.

An advantageous further development of the wind turbine furthermore provides that the cylindrical outer circumferential area of the shoulder, which faces the housing and on which the rolling bearing is screwed to the housing, does not bear against the housing when the rolling bearing is mounted on the housing. It is advantageous here that the rolling-element bearing is thus fixed to the housing exclusively by the first axial abutment surface, with the result that in the region of the cylindrical outer circumference of the shoulder no fretting corrosion can form between housing and rolling-element bearing. Furthermore this axial region of the rolling-element bearing can perform radial relative movements with respect to the housing without this leading to radial forces on the housing. However, it can be provided that centering elements are provided in the region of the cylindrical outer circumference of the shoulder on the rolling-element bearing or on the housing, which centering elements serve to fix the radial positioning of the bearing with respect to the housing during assembly of the rolling-element bearing. The centering elements, which prescribe the center diameter, can alternatively also be disposed on the radial outer circumference of the mounting flange or on a corresponding counter-surface of the housing. These centering elements can, for example, be formed in the form of integrally embodied centering knobs or a circumferential centering shoulder. However, the centering elements can also be configured as separate components. Such elements in the region of the shoulder, which prescribe a centering diameter, do not oppose the idea that the rolling-element bearing is only fixed to the housing on the first axial abutment surface.

Accordingly in one advantageous further development a rotor of the wind turbine is fixed to the two inner rings. Here with respect to the connection point of the rolling-element bearing to the housing the rotor is connected to the two inner rings on the opposite axial side of the rolling-element bearing. Preferably here the rotor is connected to both inner rings using a common screw connection. Here the rotor abuts axially on the end side of one of the two inner rings. According to the disclosure the two inner rings include through-openings which serve to receive the screw connection. Preferably here according to the disclosure a shoulder can also be provided in the inner ring, with the result that an abutment surface for the rotor is formed, which abutment surface is shifted back toward the center of the rolling-element bearing.

Here the rotor can abut either directly on one of the inner rings or abut indirectly via an intermediate element such as, for example, a friction-increasing disc. Accordingly such an intermediate element can also be disposed axially between the two inner rings. One preferred design provides that the rotor is only supported with respect to the housing via the one disclosed rolling-element bearing, so that a floating support is realized.

A particularly preferred embodiment of the wind energy installation also provides that a second stiffening ring is arranged on the end of the inner ring which is opposite the rotor on the side opposite the rotor. This second reinforcing ring can also be fixed to the inner rings via the common screw connection, which fixes the rotor to the inner rings. Here according to the disclosure a shoulder can also be provided in the corresponding inner ring, which receives the reinforcing ring, whereby a particularly compact design arises. According to the disclosure the second reinforcing ring has a smaller internal diameter than the two inner rings, whereby the radial stiffness is additionally increased.

A further embodiment of the disclosure comprises a rolling-element bearing that has a first ring having a first raceway and a second raceway and a first second ring having a third raceway and a second second ring having a fourth raceway and a first row of rolling elements configured to roll between the first raceway and the third raceway and a second row of rolling elements configured to roll between the second raceway and the fourth raceway. The first ring is configured one-part and has a first side and a second side axially spaced from the first side. The first raceway has an axially outer end and an axially inner end and the second raceway has an axially outer end and an axially inner end, and a ring raceway width is defined as an axial distance from the axially outer end of the first raceway to the axially outer end of the second raceway. A radially extending integral mounting flange extends from the first ring at a location between the first side and the second side and has a radially extending first axial abutment surface. The mounting flange includes a plurality of axially extending through-openings each configured to receive one of a plurality of fasteners for attaching the first ring to a counter-abutment surface. A first shoulder extends from the first side toward the first axial abutment surface. The first axial abutment surface is located an axial distance from the first side of the first ring, the axial distance being 10% to 50% of the ring raceway width, and a ratio of an outer diameter of the mounting flange to the width of the first ring raceways is from 5 to 25.

One alternative design of the wind turbine, which realizes the disclosed ideas, provides that the outer ring is configured as a rotating ring, which is connected to the rotor, and the two inner rings are connected to the stationary housing.

BRIEF DESCRIPTION OF THE DRAWING

The FIGURE is a sectional elevational view of a bearing according to the disclosure.

DETAILED DESCRIPTION

The FIGURE shows a rolling-element bearing 2, which is configured as a double-row tapered roller bearing. The outer ring 8 is configured one-part and includes a first raceway 14 and a second raceway 15. The inner ring is comprised of a first inner ring 4 and a second inner ring 6. Here the first inner ring 4 includes a first raceway 12, and the second inner ring 6 includes a second raceway 13. The two rolling element rows 10 roll between the raceways of the outer ring and the raceways of the inner ring. Each rolling element row 10 here is comprised of circumferentially disposed rolling elements which are configured as truncated-cone-shaped rolling elements.

The two raceways of the outer ring are inclined at an angle with respect to the axis of rotation of the rolling-element bearing, and each includes an outer axial end 26, 28. "Outer axial end" here is understood to mean the end of the surface formed by the angle of the raceway, which in the FIGURE for the outer ring lies axially outside the surface region actually rolled over by the rolling elements. The two inner rings are each formed with a guide flange for the rolling elements on their two outer axial ends, with the result that the total width of the raceways of the inner ring actually extends from one axial end to another axial end of the over-rolled surface.

The outer ring 8 includes the mounting flange 16, which is formed integrally with the outer ring 8. In the mounting flange 16 through-openings 20 are disposed that serve to fix the outer ring 8 on a machine part, in the example shown on the housing 32. On its right side the outer ring 8 is configured with a first shoulder 24, which is formed by the cylindrical outer circumferential surface region 30 and the first axial abutment surface 18. In the transition region from abutment surface 18 to the cylindrical outer circumferential surface region 30 a not-depicted encircling groove is formed, which serves to minimize stresses in the component. Between the outer circumferential surface region 30 and the housing part 32 an encircling annular gap is formed, which serves on the one hand to prevent fretting corrosion and on the other hand to make possible a radial expansion possibility of the outer ring 8 in this region. In this annular gap not-depicted centering-knobs or -lugs can be disposed, which represent a centering diameter and serve to precisely radially position the rolling-element bearing during its installation on the housing. On the axially opposite side of the outer ring 8 a second shoulder is disposed, which is represented by a second radially extending, axial abutment surface and a second cylindrical circumferential surface. In the transition region from the mounting flange to the second cylindrical circumferential surface a not-depicted undercut is also formed for minimizing of stresses. A first reinforcing ring 34 is fixed on the second abutment surface of the mounting flange 16, which first reinforcing ring 34 includes through-openings corresponding to the through-openings 20. Using a not-depicted common screw connection the reinforcing ring 34 and the outer ring 8 are fixed to the housing, which accordingly includes bores provided with internal threads. For this purpose a counter-abutment surface 22 is formed on the housing, which counter-abutment surface 22 extends radially and serves for axial positioning and fixing of the outer ring 8. The two inner rings 4, 6 include corresponding through-openings aligned with respect to one another, which serve for receiving of screw connections, using which machine elements can be attached to one or both axial end sides of the inner rings 4, 6. In the example shown a second reinforcing ring 36 is disposed on the axial end side of the first inner ring 4, which second reinforcing ring 36 includes corresponding through-openings in the example shown. For example, a not-depicted rotor of a wind turbine can be fixed to the axial end side of the second inner ring 6. For this purpose a common screw connection is provided, which presses together axially the two inner rings 6, 8, the reinforcing ring 36, and the rotor. The first abutment surface 18 of the mounting flange 20 is offset by approximately one third inward with respect to the total width G of the raceways of the outer ring. The lever arm acting on the outer ring 8 is thereby shortened by this value between the outer axial end 28 of the raceway 15 of the outer ring and the first abutment surface 18, which with the shown one-sided fixing of the outer ring 8 on the housing 32 leads to a greatly reduced tilting of the outer ring in the event of outwardly directed radial forces on the raceway 15 compared to a configuring of the outer ring 8 without shoulders. The second shoulder of the outer ring is moved inward by approximately one sixth of the total width G. An installation-space optimized design of the outer ring 8 is thereby made possible. Overall providing a reinforcing ring 34 reduces the required axial installation space requirement for the outer ring 8 by approximately one half compared to a design of the outer ring without shoulders on both sides. It is to be emphasized that the axial extension of the first raceway 14 of the outer ring 8 only overlaps by a small part with the axial region of the mounting flange 16. The axial overlap of the second raceway 15 with the mounting flange 16 is also significantly reduced by the second shoulder on the side of the disposed reinforcing ring 34. In the example shown the axial overlap of the region actually over-rolled of the second raceway 15 is reduced by almost half with an abutment surface for the reinforcing ring 34 shifted back with respect to the total width G of the raceways by approximately 20%.

The positive influence of the shoulders in the outer ring is particularly pronounced in bearings that have a very large diameter D compared to the total width G of the raceways. For example, thin section bearings are mentioned, which have particularly thin rings in the axial and radial direction compared to their diameter. In the double row tapered roller bearing depicted here the outer diameter D of the mounting flange 16 is indicated by reference D. With the use of such a bearing in wind turbines, according to the disclosure the diameter D of the mounting flange 16 of the bearing preferably falls in the range greater than 200 cm. In the example shown, the ratio of the outer diameter D of the mounting flange to the total width G of the raceways is preferably approximately 15:1.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling element bearings having mounting flanges.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

2 Rolling-element bearing
4 Inner ring
6 Inner ring
8 Outer ring
10 Rolling element row
12 First raceway of the inner ring
13 Second raceway of the inner ring
14 First raceway of the outer ring
15 Second raceway of the outer ring
16 Mounting flange
18 First axial abutment surface
20 Through-openings
22 Counter-abutment surface
24 First shoulder
26 Outer axial end of the raceway
28 Outer axial end of the raceway
30 Cylindrical outer circumferential surface region
32 Housing
34 First reinforcing ring
36 Second reinforcing ring
B Width of the mounting flange
G Total width of the raceways
D Outer diameter of the mounting flange

What is claimed is:
1. A rolling-element bearing comprising:
a first ring having a first raceway and a second raceway and a first second ring having a third raceway and a second second ring having a fourth raceway and a first row of rolling elements configured to roll between the first raceway and the third raceway and a second row of rolling elements configured to roll between the second raceway and the fourth raceway,
the first ring being configured one-part and having a first side and a second side axially spaced from the first side;
the first raceway having an axially outer end and an axially inner end and the second raceway having an axially outer end and an axially inner end, a ring raceway width being defined as an axial distance from the axially outer end of the first raceway to the axially outer end of the second raceway;
a radially extending integral mounting flange extending from the first ring at a location between the first side and the second side and having a radially extending first axial abutment surface, the mounting flange including a plurality of axially extending through- openings each configured to receive one of a plurality of fasteners for attaching the first ring to a counter-abutment surface; and a first shoulder extending from the first side toward the first axial abutment surface;

wherein the first axial abutment surface is located an axial distance from the first side of the first ring, the axial distance being 10% to 50% of the ring raceway width, and wherein a ratio of an outer diameter of the mounting flange to the ring raceway width is from 5 to 25.

2. The rolling-element bearing according to claim 1, wherein the axial distance is 20% to 40% of the ring raceway width.

3. The rolling-element bearing according to claim 2, wherein the ratio of the outer diameter of the mounting flange to the ring raceway width is from 14 to 16.

4. The rolling-element bearing according to claim 1, wherein the rolling-element bearing is configured as a double row tapered roller bearing or barrel roller bearing in an O-arrangement.

5. The rolling-element bearing according to claim 1, wherein the first ring is an outer ring and the second ring is an inner ring.

6. The rolling-element bearing according to claim 1, including a second shoulder extending from the second side toward a second axial abutment surface of the mounting flange, wherein an axial distance from the second side of the first ring to the second axial abutment surface is 10% to 40% of the ring raceway width.

7. The rolling-element bearing according to claim 1, wherein an axial width of the mounting flange in a region of the through-openings is at least 30% of the ring raceway width.

8. The rolling-element bearing according to claim 1, further including a reinforcing ring abutting against the second axial abutment surface of the mounting flange, and wherein the reinforcing ring has an outer diameter that is greater than the outer diameter of the mounting flange.

9. The rolling-element bearing according to claim 1,
wherein the axial distance is 20% to 40% of the ring raceway width, wherein the ratio of the outer diameter of the mounting flange to the ring raceway width is from 14 to 16, wherein the first ring is an outer ring and the second ring is an inner ring, including a second shoulder extending from the second side toward a second axial abutment surface of the mounting flange, wherein an axial distance from the second side of the first ring to the second axial abutment surface is 10% to 40% of the ring raceway width, and wherein an axial width of the mounting flange in a region of the through-openings is at least 30% of the ring raceway width.

10. A wind turbine including a stationary housing and a rolling-element bearing according to claim 1, wherein the rolling-element bearing serves as a rotor bearing and the housing includes the counter-abutment surface, wherein the mounting flange and the reinforcing ring are fixed to the counter-abutment surface of the housing using a common screw connection.

11. The wind turbine according to claim 10, wherein the first shoulder does not abut on the housing.

12. The wind turbine according to claim 10, wherein a rotor of the wind turbine is fixed on one of the inner rings or on both inner rings using a common screw connection, wherein the housing and the rotor are fixed to the rolling-element bearing on opposite sides of the rolling-element bearing.

13. The wind turbine according to claim 12, wherein opposite the rotor a second reinforcing ring is fixed abutting on the second inner ring using a screw connection.

* * * * *